United States Patent
Bortoli et al.

(10) Patent No.: US 10,954,864 B2
(45) Date of Patent: Mar. 23, 2021

(54) TRANSMISSION FOR LOW SPOOL OF GAS TURBINE ENGINE

(71) Applicant: HAMILTON SUNDSTRAND CORPORATION, Charlotte, NC (US)

(72) Inventors: Stephen Michael Bortoli, Roscoe, IL (US); Aaron M. Finke, Janesville, WI (US); Mark J. Franklin, Janesville, WI (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 73 days.

(21) Appl. No.: 16/363,333

(22) Filed: Mar. 25, 2019

(65) Prior Publication Data

US 2020/0309037 A1 Oct. 1, 2020

(51) Int. Cl.
| | |
|---|---|
| *F01D 25/00* | (2006.01) |
| *F02C 7/36* | (2006.01) |
| *F02C 7/32* | (2006.01) |
| *F02K 3/06* | (2006.01) |
| *F16H 3/093* | (2006.01) |

(52) U.S. Cl.
CPC ............... *F02C 7/36* (2013.01); *F02C 7/32* (2013.01); *F02K 3/06* (2013.01); *F16H 3/093* (2013.01); *F05D 2260/4031* (2013.01); *F16H 2003/0931* (2013.01); *F16H 2200/0043* (2013.01)

(58) Field of Classification Search
CPC ...... F02C 7/36; F02C 7/32; F16H 3/93; F16H 2003/0931; F05D 2260/4031; F01D 15/12
See application file for complete search history.

(56) References Cited

U.S. PATENT DOCUMENTS

| | | | | |
|---|---|---|---|---|
| 3,124,974 A | * | 3/1964 | Hobbs | F16H 3/663 475/276 |
| 4,106,358 A | * | 8/1978 | Morrison | F16H 3/097 74/331 |
| 8,876,650 B2 | * | 11/2014 | Lemmers, Jr. | F02C 7/32 475/259 |
| 8,966,911 B2 | * | 3/2015 | Ress, Jr. | F02K 3/06 60/802 |
| 9,200,592 B2 | * | 12/2015 | Berryann | F02K 3/04 |
| 9,347,373 B2 | | 5/2016 | Menheere et al. | |
| 10,167,948 B2 | | 1/2019 | Ghike et al. | |
| 2018/0045119 A1 | | 2/2018 | Sheridan et al. | |
| 2018/0209513 A1 | | 7/2018 | Lemmers, Jr. | |

FOREIGN PATENT DOCUMENTS

| | | | | |
|---|---|---|---|---|
| DE | 4226578 C1 | * | 12/1993 | ............. F16H 3/093 |
| EP | 3438431 A1 | | 2/2019 | |
| GB | 2173266 A | | 10/1986 | |
| JP | H0211951 A | | 1/1990 | |

OTHER PUBLICATIONS

European Search Report for European Application No. 19215833.5, dated Jul. 23, 020, 19 pages.

* cited by examiner

*Primary Examiner* — Ninh H. Nguyen
(74) *Attorney, Agent, or Firm* — Cantor Colburn LLP

(57) ABSTRACT

A power transmission includes an input shaft, an output shaft, and a plurality of gear ratios selectably engagable with the input shaft and the output shaft to transfer rotational energy from the input shaft to the output shaft to drive the output shaft at a selected output shaft speed. A plurality of clutches, each clutch is located at a clutch lay shaft of a plurality of clutch lay shafts and is configured to control selective engagement of only one gear ratio of the plurality of gear ratios.

18 Claims, 5 Drawing Sheets

TRANSMISSION FOR LOW SPOOL OF GAS TURBINE ENGINE

BACKGROUND

Exemplary embodiments of the present disclosure pertain to the art of gas turbine engines, and more particularly to mechanical power extraction from a gas turbine engine.

Gas turbine engines are utilized to power aircraft, providing thrust to propel the aircraft. Further, mechanical energy is often extracted from the gas turbine engine to provide electrical power to various aircraft components and systems through a generator, at which rotational energy extracted from the gas turbine engine is used to generate electrical power.

Most modern gas turbine engines have multiple spools, e.g. a low pressure spool and a high pressure spool. Traditionally, the high pressure spool is used to drive the various aircraft components and systems via the generator. Efficiency concerns led to a desire to move power extraction from the high pressure spool to the low pressure spool. The low pressure spool, however, is typically not used for power extraction do to the larger range of operating speeds of the lower pressure spool, compared to a the range of operating speeds of the high pressure spool.

BRIEF DESCRIPTION

In one embodiment, a power transmission includes an input shaft, an output shaft, and a plurality of gear ratios selectably engagable with the input shaft and the output shaft to transfer rotational energy from the input shaft to the output shaft to drive the output shaft at a selected output shaft speed. A plurality of clutches, each clutch is located at a clutch lay shaft of a plurality of clutch lay shafts and is configured to control selective engagement of only one gear ratio of the plurality of gear ratios.

Additionally or alternatively, in this or other embodiments a secondary shaft is located between the plurality of clutch lay shafts and the output shaft and is configured to transfer rotational energy between the plurality of clutch lay shafts and the output shaft.

Additionally or alternatively, in this or other embodiments the secondary shaft is coaxial with the input shaft.

Additionally or alternatively, in this or other embodiments the secondary shaft is operably connected to the output shaft via a gear mesh connection.

Additionally or alternatively, in this or other embodiments each gear ratio includes an input gear located at and rotatable with the input shaft, and a ratio output gear located at and rotatable with a clutch lay shaft of the plurality of clutch lay shafts. The ratio output gear is selectably engagable with the input gear via opening of the respective clutch of the plurality of clutches disposed at the clutch lay shaft.

Additionally or alternatively, in this or other embodiments the plurality of clutch lay shafts is two clutch lay shafts.

Additionally or alternatively, in this or other embodiments two gear ratios are located at each clutch lay shaft of the two clutch lay shafts.

Additionally or alternatively, in this or other embodiments each gear ratio of the plurality of gear ratios is operably connected to a separate respective clutch of the plurality of clutches.

Additionally or alternatively, in this or other embodiments the plurality of gear ratios is four gear ratios.

Additionally or alternatively, in this or other embodiments a rotational speed of the output shaft is in the range of 8000 rpm to 16000 rpm.

In another embodiment, a gas turbine engine includes a turbine rotating via a gas turbine engine shaft, a tower shaft operably connected to the gas turbine engine shaft configured as a power takeoff of rotational energy from the gas turbine engine shaft, and a power transmission. The power transmission includes an input shaft operably connected to and driven by the tower shaft, an output shaft and a plurality of gear ratios selectably engagable with the input shaft and the output shaft to transfer rotational energy from the input shaft to the output shaft to drive the output shaft at a selected output shaft speed. A plurality of clutches are each clutch located at a clutch lay shaft of a plurality of clutch lay shafts and are configured to control selective engagement of only one gear ratio of the plurality of gear ratios.

Additionally or alternatively, in this or other embodiments a generator is operably connected to the output shaft to convert the rotational energy of the output shaft to electrical power.

Additionally or alternatively, in this or other embodiments a secondary shaft is located between the plurality of clutch lay shafts and the output shaft and is configured to transfer rotational energy between the plurality of clutch lay shafts and the output shaft.

Additionally or alternatively, in this or other embodiments the secondary shaft is operably connected to the output shaft via a gear mesh connection.

Additionally or alternatively, in this or other embodiments each gear ratio includes an input gear located at and rotatable with the input shaft, and a ratio output gear located at and rotatable with a clutch lay shaft of the plurality of clutch lay shafts. The ratio output gear is selectably engagable with the input gear via opening of the respective clutch of the plurality of clutches located at the clutch lay shaft.

Additionally or alternatively, in this or other embodiments the plurality of clutch lay shafts is two clutch lay shafts.

Additionally or alternatively, in this or other embodiments two gear ratios are located at each clutch lay shaft of the two clutch lay shafts.

Additionally or alternatively, in this or other embodiments each gear ratio of the plurality of gear ratios is operably connected to a separate respective clutch of the plurality of clutches.

Additionally or alternatively, in this or other embodiments a rotational speed of the output shaft is in the range of 8000 rpm to 16000 rpm.

Additionally or alternatively, in this or other embodiments the gas turbine engine shaft is an inner shaft of the gas turbine engine interconnecting a fan, a low pressure compressor and a low pressure turbine of the gas turbine engine.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
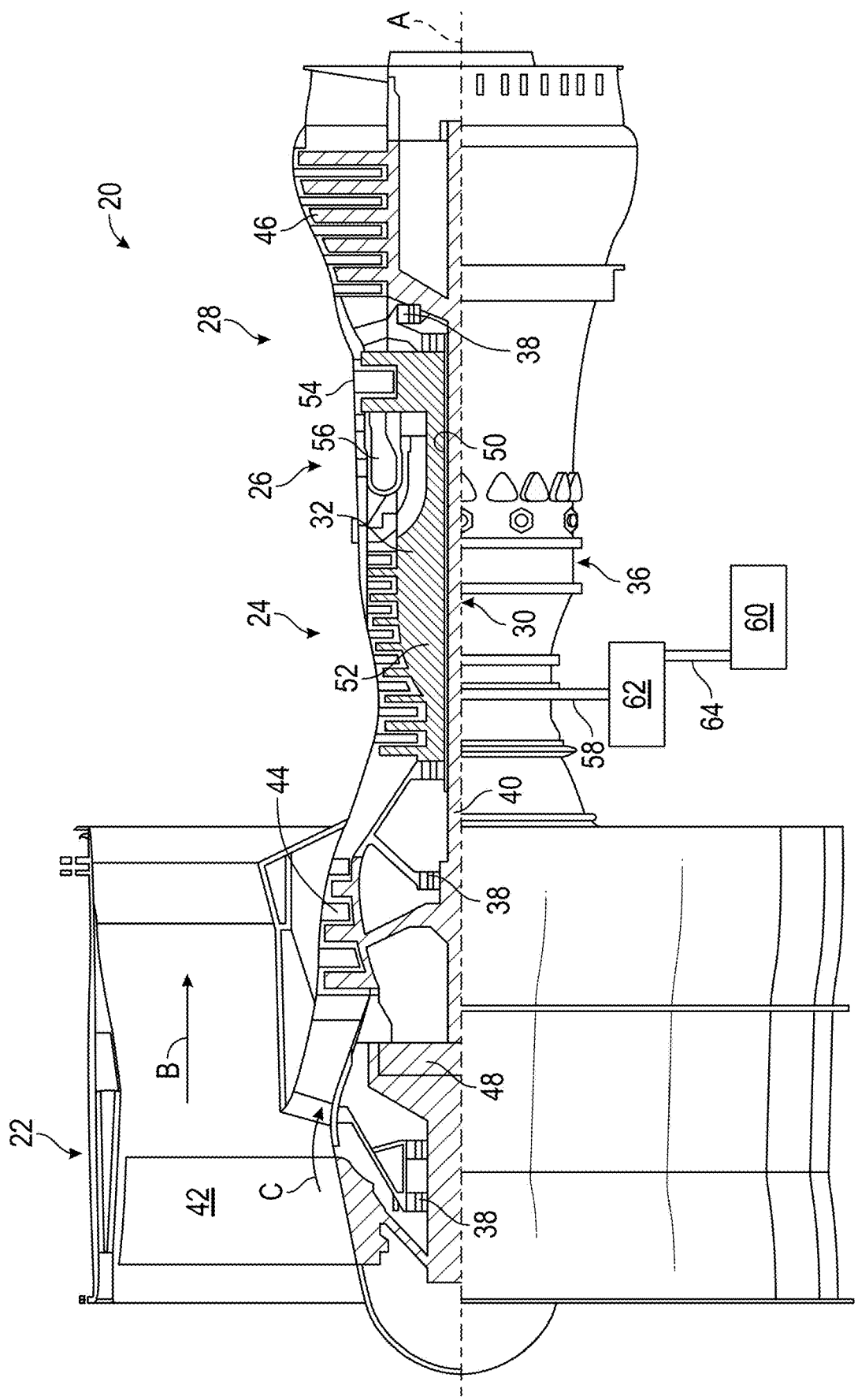
FIG. 1 is a schematic illustration of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

A power takeoff or tower shaft 58 is operably connected to the inner shaft 40 to extract rotational energy therefrom. The rotational energy of the tower shaft 58 is utilized by a generator 60, which converts the rotational energy to electrical energy to power accessory components and/or aircraft systems (not shown). Because the inner shaft 40 has a large operating speed range, larger than is useful or compatible with the generator 60, a transmission 62 is located upstream of generator 60 to provide an output rotational speed to the generator 60 within a selected speed range for use by the generator 60.

Figure 2:
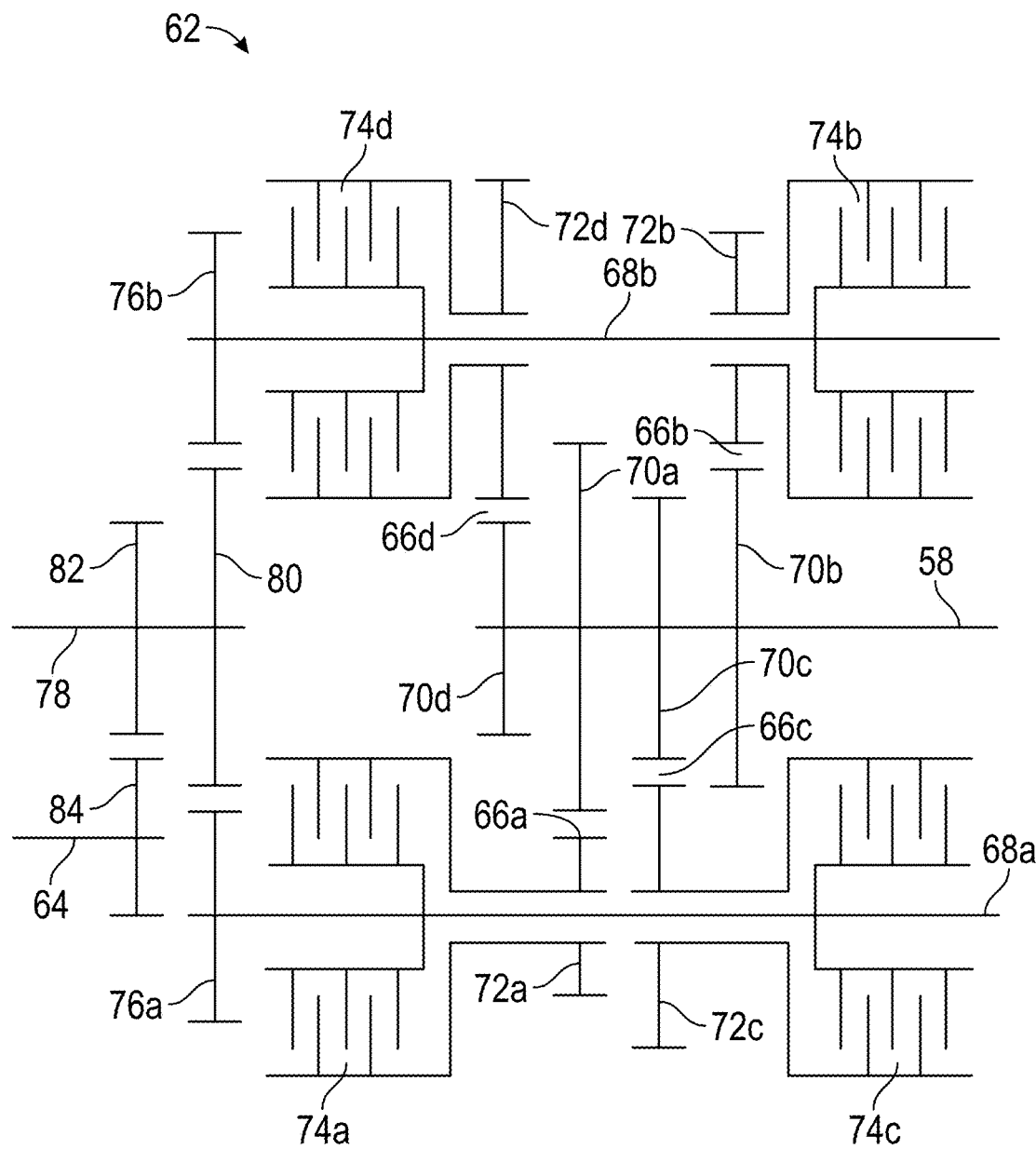
FIG. 2 is a schematic illustration of a power transmission for a gas turbine engine.

Referring now to FIG. 2, a schematic illustration of an embodiment of the transmission 62 is illustrated. The transmission 62 receives input rotational energy via an input shaft, for example, the tower shaft 58, and outputs rotational energy toward the generator 60 via, for example, output shaft 64. The transmission 62 includes a plurality of gear ratios 66, for example, four gear ratios 66. While four gear ratios 66 are illustrated and described herein, one skilled in the art will readily appreciate that other numbers of gear ratios 66, for example, three, five or six gear ratios 66 may be utilized depending on need of the particular system, to cover a required inner shaft 40 rotational speed range.

Each gear ratio 66 is connected to a clutch lay shaft 68. In the embodiment of FIG. 2, two clutch lay shafts 68 are utilized, with two gear ratios 66 operably connected to each of the two clutch lay shafts 68. For example, first gear ratio 66a and third gear ratio 66c are operably connected to a first lay shaft 68a, while second gear ratio 68b and fourth gear ratio 68d are operably connected to a second lay shaft 68b. Each gear ratio (66a, 66b, 66c, 66d) has a respective input gear (70a, 70b, 70c, 70d) located at and rotatable with the input shaft 58. The input gears (70a, 70b, 70c, 70d) are selectably engagable with a respective ratio output gear (72a, 72b, 72c, 72d) disposed at and rotatable with the associated clutch lay shaft (68a 68b). In the embodiment of FIG. 2, a first ratio output gear 72a and a third ratio output gear 72c are located at the first clutch lay shaft 68a, while a second ratio output gear 72b and a fourth ratio output gear 72d are located at the second clutch lay shaft 68b.

The gear ratios (66a, 66b, 66c, 66d) are selectably engaged through the selective engagement and disengagement of a plurality of clutches (74a, 74b, 74c, 74d). Each clutch (74a, 74b, 74c, 74d) is associated with only one gear ratio, and a different one, of the plurality of gear ratios (66a, 66b, 66c, 66d). The clutches (74a, 74b, 74c, 74d) are located at the clutch lay shafts (68a, 68b) and are each operably connected to one of the ratio output gears (72a, 72b, 72c, 72d). In this embodiment, first clutch 74a is located at the first clutch lay shaft 68a and is operably connected to the first ratio output gear 72a and rotates with the clutch lay shaft 68a. Disengagement or opening of the clutch 74a engages the first ratio output gear 72a with the first input gear 70a resulting in the rotation of the first clutch lay shaft 68a at the selected rotational speed.

The arrangement and operation of the other clutches 74 at the outer ratio output gears 72 is similar, and for the sake of brevity will not be described in detail herein. The rotational speed of the first clutch lay shaft 68a and the second clutch lay shaft 68b is dependent on the selective disengagement or opening of clutches (74a, 74b, 74c, 74d) causing selective engagement of one of the ratio output gears (72a, 72b, 72c, 72d) with their respective input gear (70a, 70b, 70c, 70d).

Each clutch lay shaft (68a, 68b) includes a lay shaft output gear (76a, 76b), which is engaged with a secondary shaft 78 through engagement with a secondary shaft input gear 80. The engagement drives rotation of the secondary shaft 78, which is connected to the output shaft 64 through engagement of a secondary shaft output gear 82 of the secondary shaft 78 with an output shaft gear 84 of the output shaft 64.

Figure 3:
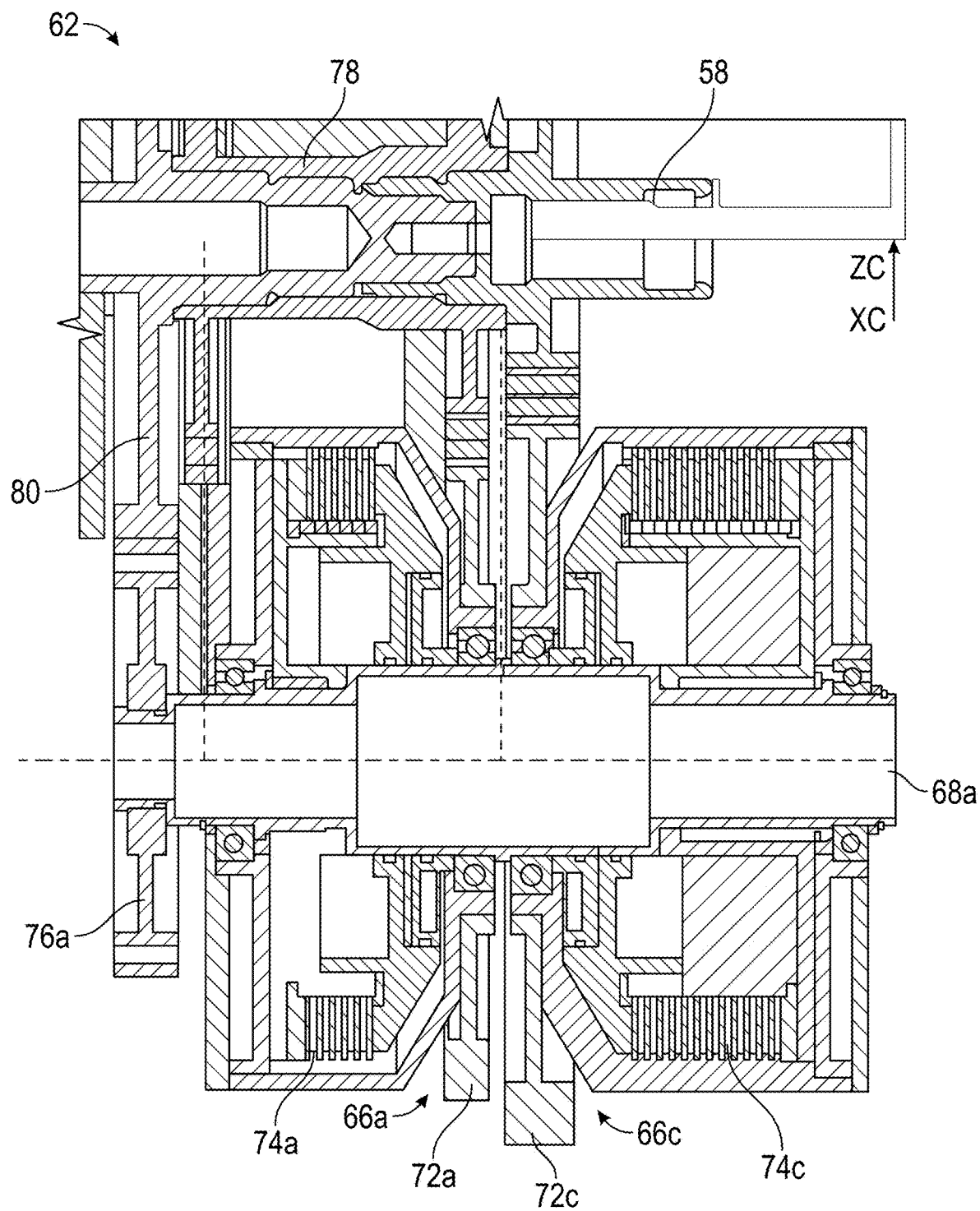
FIG. 3 is a cross-sectional view of an embodiment of a power transmission of a gas turbine engine.
Figure 4:
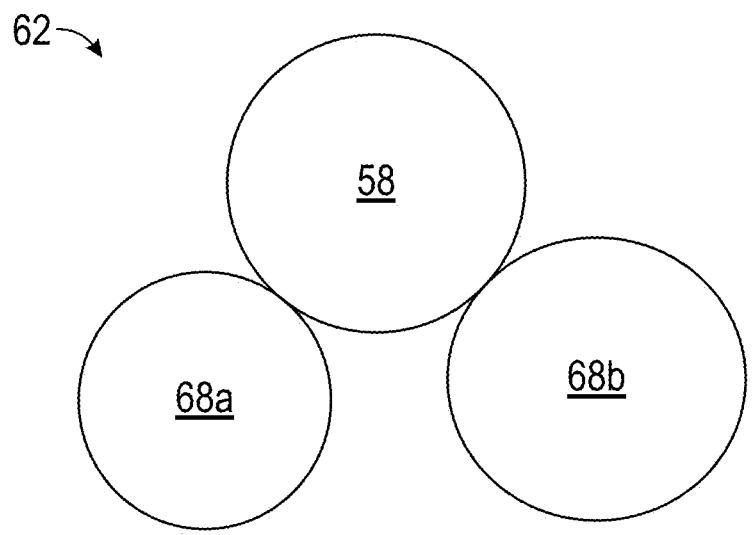
FIG. 4 is another cross-sectional view of an embodiment of a power transmission of a gas turbine engine.
Figure 5:
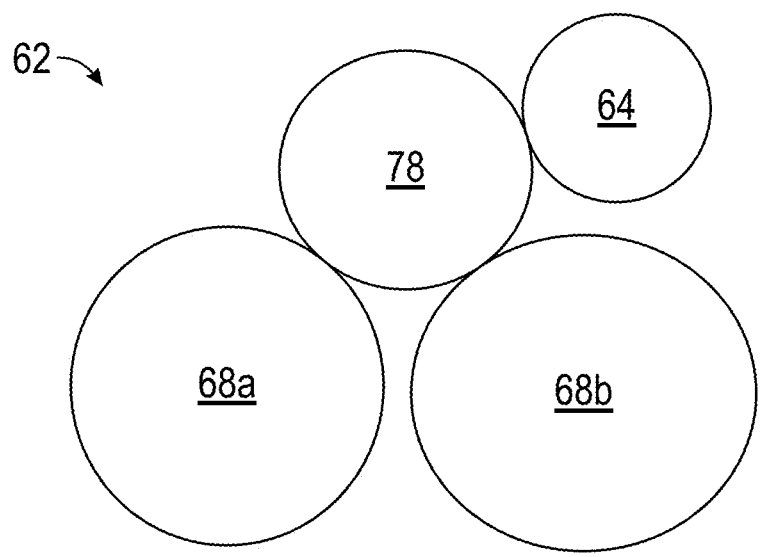
FIG. 5 is another cross-sectional view of an embodiment of a power transmission of a gas turbine engine.

Referring now to FIG. 3, illustrated is a cross-sectional view of the transmission 62 at the first clutch lay shaft 68a. The cross-sectional view of FIG. 3 illustrates first clutch 74a and third clutch 74c disposed at the first clutch lay shaft 68a to control selective engagement of the first gear ratio 66a and the third gear ratio 66b. Rotational energy is transferred from the first clutch lay shaft 68a to the secondary shaft 78 via the engagement of first lay shaft output gear 76a with secondary shaft input gear 80. In some embodiments, as shown, the secondary shaft 78 is coaxial with the input shaft 58. FIGS. 4 and 5 illustrate schematic axial cross-sectional views of the view of the transmission 62 at input gear 70 and secondary shaft input gear 80, respectively.

Figure 6:
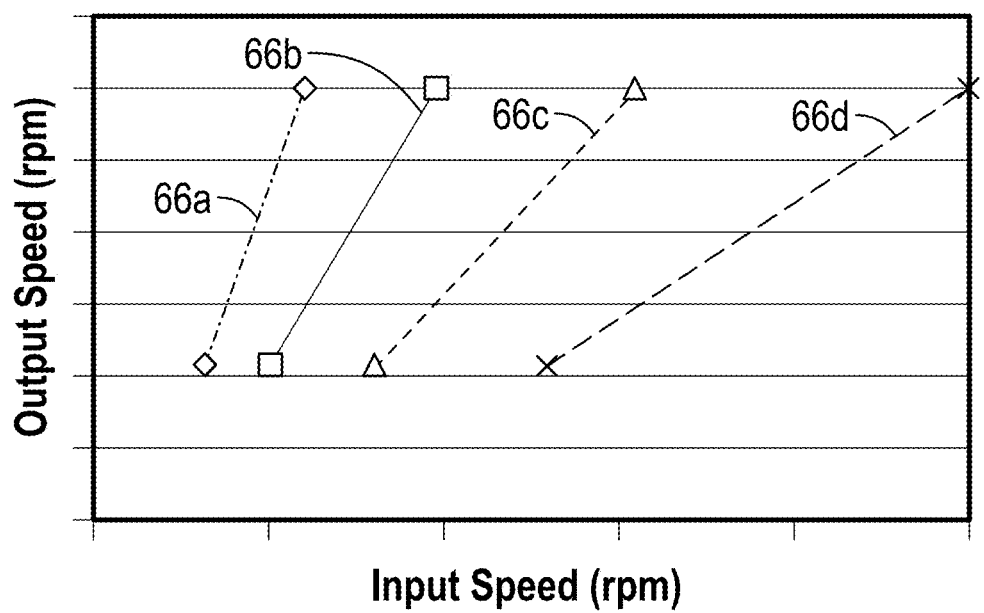
FIG. 6 is a graph illustrating input speed to output speed of a power transmission.

Referring now to FIG. 6, illustrated is a graph of input speed to output speed ranges of each of the gear ratios (66a, 66b, 66c, 66d). Each gear ratio (66a, 66b, 66c, 66d) is configured to provide an output speed in the same output speed range over a different range of input speeds. In some embodiments, the transmission 62 is configured such that the output speed range of the output shaft 64 is in the range of 8000 rpm to 16000 rpm.

Use of the multiple gear ratios 66 allows the transfer of usable rotational energy in the form of output rotational speed from the transmission 62 from the tower shaft 58 to the generator 60 over a wide range of input speeds of the tower shaft 68, corresponding to a wide range of inner shaft 40 rotational speeds. Further, this approach and configuration has the benefit of being simple in that it only uses gears and clutches 74, with one clutch 74 per gear ratio 66. There is no need to utilize additional one-way clutches or synchromesh arrangements, which are typical in such transmissions. Also, torque through the transmission 62 may be held consistent as one clutch 74 can close while the next clutch 74 opens.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power transmission, comprising:
    an input shaft;
    an output shaft;
    a plurality of gear ratios selectably engagable with the input shaft and the output shaft to transfer rotational energy from the input shaft to the output shaft to drive the output shaft at a selected output shaft speed;
    a plurality of clutches, each clutch disposed at a clutch lay shaft of a plurality of clutch lay shafts and configured to control selective engagement of only one gear ratio of the plurality of gear ratios; and
    a secondary shaft disposed between the plurality of clutch lay shafts and the output shaft and configured to transfer rotational energy between the plurality of clutch lay shafts and the output shaft.

2. The power transmission of claim 1, wherein the secondary shaft is coaxial with the input shaft.

3. The power transmission of claim 1, wherein the secondary shaft is operably connected to the output shaft via a gear mesh connection.

4. The power transmission of claim 1, wherein each gear ratio comprises:
    an input gear disposed at and rotatable with the input shaft; and
    a ratio output gear disposed at and rotatable with a clutch lay shaft of the plurality of clutch lay shafts;
    wherein the ratio output gear is selectably engagable with the input gear via opening of the respective clutch of the plurality of clutches disposed at the clutch lay shaft.

5. The power transmission of claim 1, wherein the plurality of clutch lay shafts is two clutch lay shafts.

6. The power transmission of claim 5, wherein two gear ratios are disposed at each clutch lay shaft of the two clutch lay shafts.

7. The power transmission of claim 6, wherein each gear ratio of the plurality of gear ratios is operably connected to a separate respective clutch of the plurality of clutches.

8. The power transmission of claim 1, wherein the plurality of gear ratios is four gear ratios.

9. The power transmission of claim 1, wherein a rotational speed of the output shaft is in the range of 8000 rpm to 16000 rpm.

10. A gas turbine engine, comprising:
    a turbine rotating via a gas turbine engine shaft;
    a tower shaft operably connected to the gas turbine engine shaft configured as a power takeoff of rotational energy from the gas turbine engine shaft;
    a power transmission, including:
        an input shaft operably connected to and driven by the tower shaft;
        an output shaft;
        a plurality of gear ratios selectably engagable with the input shaft and the output shaft to transfer rotational energy from the input shaft to the output shaft to drive the output shaft at a selected output shaft speed;
        a plurality of clutches, each clutch disposed at a clutch lay shaft of a plurality of clutch lay shafts and configured to control selective engagement of only one gear ratio of the plurality of gear ratios; and
        a secondary shaft disposed between the plurality of clutch lay shafts and the output shaft and configured to transfer rotational energy between the plurality of clutch lay shafts and the output shaft.

11. The gas turbine engine of claim 10, further comprising a generator operably connected to the output shaft to convert the rotational energy of the output shaft to electrical power.

12. The gas turbine engine of claim 10, wherein the secondary shaft is operably connected to the output shaft via a gear mesh connection.

13. The gas turbine engine of claim 10, wherein each gear ratio comprises:
   an input gear disposed at and rotatable with the input shaft; and
   a ratio output gear disposed at and rotatable with a clutch lay shaft of the plurality of clutch lay shafts;
   wherein the ratio output gear is selectably engagable with the input gear via opening of the respective clutch of the plurality of clutches disposed at the clutch lay shaft.

14. The gas turbine engine of claim 10, wherein the plurality of clutch lay shafts is two clutch lay shafts.

15. The gas turbine engine of claim 14, wherein two gear ratios are disposed at each clutch lay shaft of the two clutch lay shafts.

16. The gas turbine engine of claim 15, wherein each gear ratio of the plurality of gear ratios is operably connected to a separate respective clutch of the plurality of clutches.

17. The gas turbine engine of claim 10, wherein a rotational speed of the output shaft is in the range of 8000 rpm to 16000 rpm.

18. The gas turbine engine of claim 10, wherein the gas turbine engine shaft is an inner shaft of the gas turbine engine interconnecting a fan, a low pressure compressor and a low pressure turbine of the gas turbine engine.

\* \* \* \* \*